US007530614B2

(12) United States Patent
Nichols (10) Patent No.: US 7,530,614 B2
(45) Date of Patent: May 12, 2009

(54) PICKUP TRUCK ACCESSORY

(76) Inventor: Christopher B. Nichols, 611 E. 5th St., Tucson, AZ (US) 85705

( * ) Notice: Subject to any disclaimer, the term of this patent is extended or adjusted under 35 U.S.C. 154(b) by 0 days.

(21) Appl. No.: 11/872,461

(22) Filed: Oct. 15, 2007

(65) Prior Publication Data

US 2008/0143133 A1 Jun. 19, 2008

Related U.S. Application Data

(60) Provisional application No. 60/829,504, filed on Oct. 13, 2006.

(51) Int. Cl.
*B60J 7/10* (2006.01)
(52) U.S. Cl. .................. 296/3; 296/100.17; 410/150
(58) Field of Classification Search .............. 296/3, 296/136.03, 100.12, 100.17, 100.18; 410/150; 224/403, 405
See application file for complete search history.

(56) References Cited

U.S. PATENT DOCUMENTS

| 5,275,458 A | * | 1/1994 | Barben et al. | 296/100.18 |
| 5,393,114 A | * | 2/1995 | Christensen | 296/36 |
| 7,070,374 B2 | * | 7/2006 | Womack et al. | 410/104 |

* cited by examiner

*Primary Examiner*—Joseph D Pape
(74) *Attorney, Agent, or Firm*—Dale F. Regelman; Quarles & Brady LLP (57) ABSTRACT

A pickup truck accessory comprising a first L-shaped assembly that can be removeably attached to a first side of a pickup truck bed, a first tubular member attached to the first L-shaped assembly, a second L-shaped assembly that can be removeably attached to a second side of the pickup truck bed, a second tubular member attached to the second L-shaped assembly, and a rack assembly slidably disposed along the first tubular member and along the second tubular member.

7 Claims, 11 Drawing Sheets

PICKUP TRUCK ACCESSORY

CROSS REFERENCE TO RELATED APPLICATIONS

This application claims priority from a U.S. Provisional Application having Ser. No. 60/829,504, filed Oct. 13, 2006, wherein that Provisional Application is hereby incorporated herein by reference.

FIELD OF THE INVENTION

The invention relates to a pickup truck accessory. In certain embodiments, the invention is directed to a truck accessory rail.

BACKGROUND OF THE INVENTION

Various accessories are known for use with pickup trucks. Such accessories include bicycle racks, tonneau covers, and the like. Prior art pickup truck accessories are often attached to the vehicle using screws, bolts, and the like. Such attachment methods require holes to be drilled in various locations on the vehicle.

SUMMARY OF THE INVENTION

Applicant's invention comprises a pickup truck accessory. The pickup truck accessory comprises a first L-shaped assembly that can be removeably attached to a first side of a pickup truck bed without drilling holes therein, and a first rectangular tubular member comprising a first longitudinal aperture extending from one end to the other, and attached to the first L-shaped assembly such that the longitudinal aperture faces outwardly therefrom.

The pickup truck accessory further comprises a second L-shaped assembly that can be removeably attached to a second side of the pickup truck bed without drilling holes therein, and a second rectangular tubular member comprising second longitudinal aperture extending from one end to the other, and attached to the second L-shaped assembly such that the second longitudinal aperture faces outwardly therefrom;

The pickup truck accessory further comprises a rack assembly comprising a first fixturing member formed to include a first fixturing member aperture extending therethrough, a second fixturing member formed to include a second fixturing member aperture extending therethrough, and a connecting member having two ends, wherein a first end of the connecting member is attached to the first fixturing member, and wherein a second end of the connecting member is attached to the second fixturing member.

The pickup truck accessory further comprises a first securing member comprising a first rectangular base and a first cylindrical member attached to the first rectangular base and extending outwardly therefrom, wherein the distal end of the first cylindrical member is threaded, wherein the first rectangular base is moveably disposed within the first longitudinal aperture, and wherein the distal end of first cylindrical member extends through the first longitudinal aperture, and wherein the distal end of the first cylindrical member extends through the first fixturing member aperture.

The pickup truck accessory further comprises a second securing member comprising a second rectangular base and a second cylindrical member attached to the second rectangular base and extending outwardly therefrom, wherein the distal end of the second cylindrical member is threaded, wherein the second rectangular base is moveably disposed within the second longitudinal aperture, and wherein the distal end of second cylindrical member extends through the second longitudinal aperture, and wherein the distal end of the second cylindrical member extends through the second fixturing member aperture.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
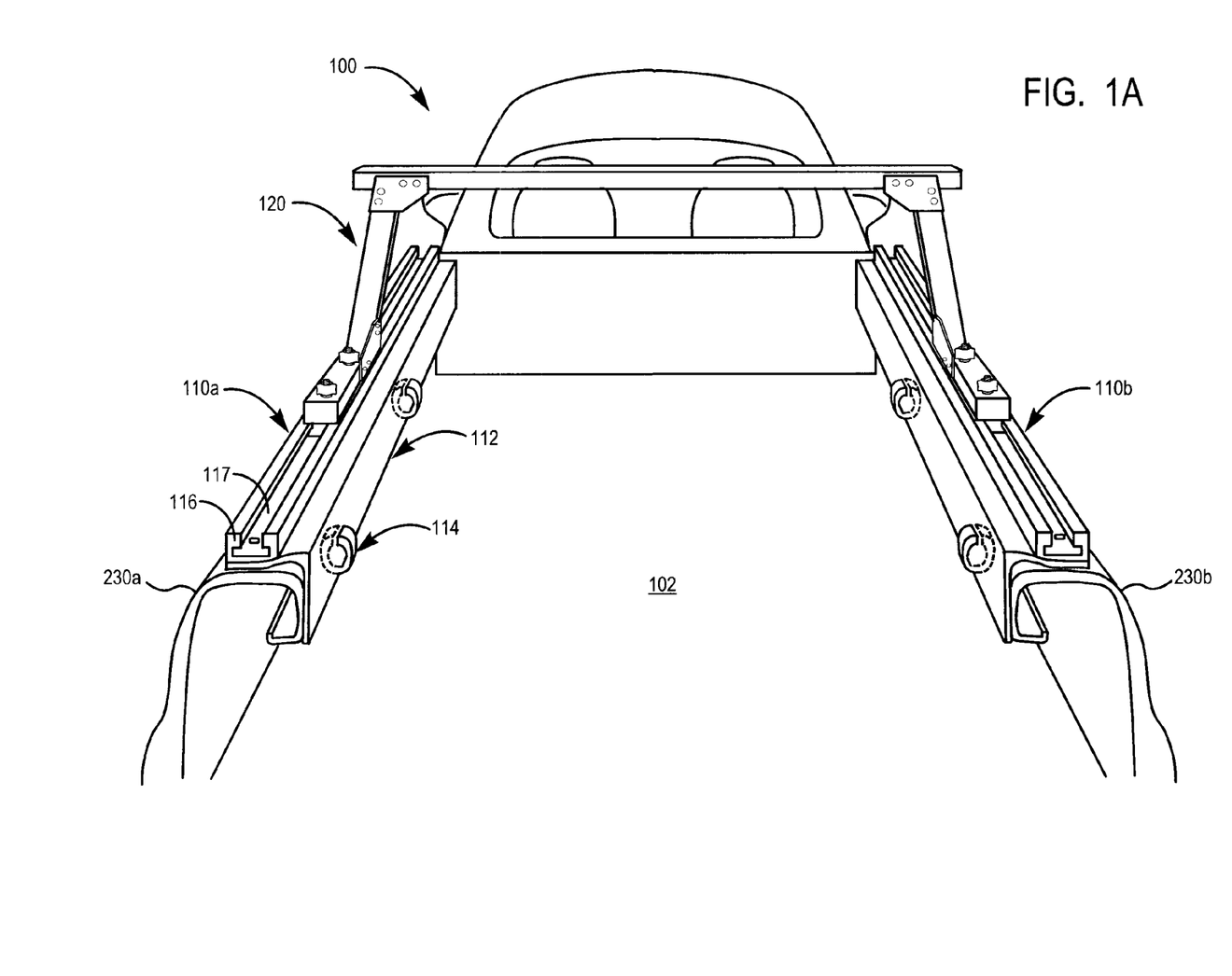
FIG. 1A is a perspective view of one embodiment of Applicant's pickup truck accessor removeably disposed in a pickup truck bed.
Figure 2:
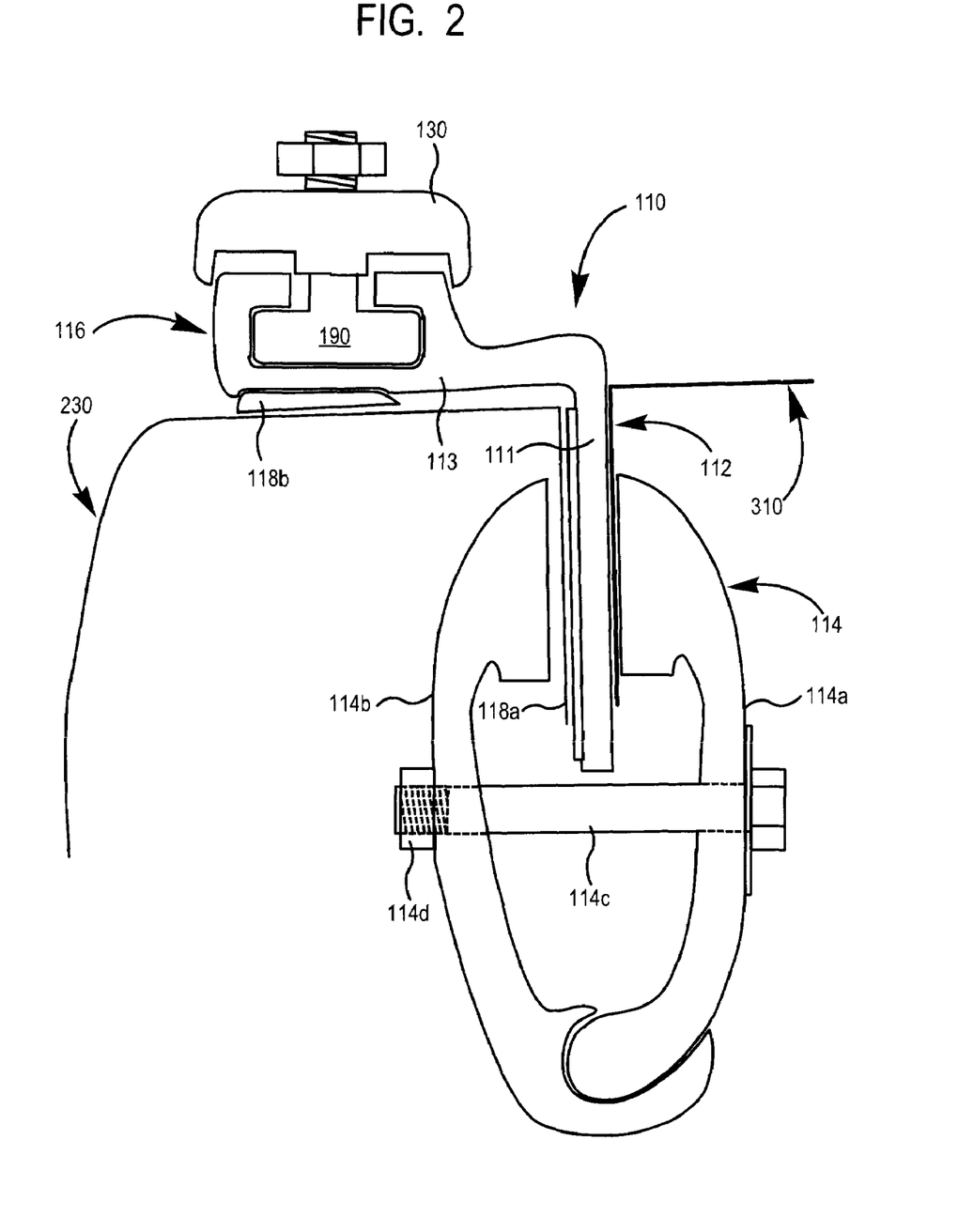
FIG. 2 is a side view showing Applicant's clamp releaseably attaching Applicant's L-shaped assembly to a side of a pickup truck bed.

FIG. 1A is a perspective view showing truck 100 in combination with truck accessory rail 110a, truck accessory rail 110b, and overhead rack 120. Accessory rails 110a and 110b provide attachment means to releaseably affix aftermarket truck accessories, such as an overhead rack, bicycle rack, tie-down points, as well as other accessories, to truck 100. In the illustrated embodiment of FIG. 1A, truck accessory rails 110a and 110b are shown attached to the sides of a pickup truck bed. Each truck accessory rail 110 comprises L-shaped assembly 112, clamp 114, rectangular tubular member 116 formed to include a longitudinal aperture extending through a side thereof, and optionally a first compliant material 118a (FIG. 2) and a second compliant material 118b (FIG. 2). In the illustrated embodiment of FIG. 1A, overhead rack 120 is shown releaseably and moveably attached to accessory rails 110a and 100b.

In certain embodiments, L-shaped member 112 and rectangular tubular member 116 are separately formed, and subsequently attached using conventional attachments methods to form accessory rail 110. In other embodiments, L-shaped member 112 and rectangular tubular member 116 are integrally formed.

In certain embodiments, truck accessory rail 110 comprises a rigid material selected from the group consisting of metal, an engineering plastic, wood, or combinations thereof. By "engineering plastic," Applicant means a polymeric material comprising a tensile modulus of about 500,000 psi or greater, and/or a flexural modulus of about 500,000 psi or greater. Such polymeric materials include, without limitation, one or more polyamides, one or more polyimides, one or more polyetheretherketones, one or more cured epoxy resins, and the like. In certain embodiments, truck accessory rail 110 comprises a one piece aluminum extrusion or molded plastic. In certain embodiments, truck accessory rail 110 is L-shaped, but may have a superimposed secondary shape for strength, stability, fit, and water drainage. In certain embodiments, truck accessory rail 110 comprises a length to fit trucks sold in commerce by a variety of vendors under a variety of trade names and trademarks.

Figure 1B:
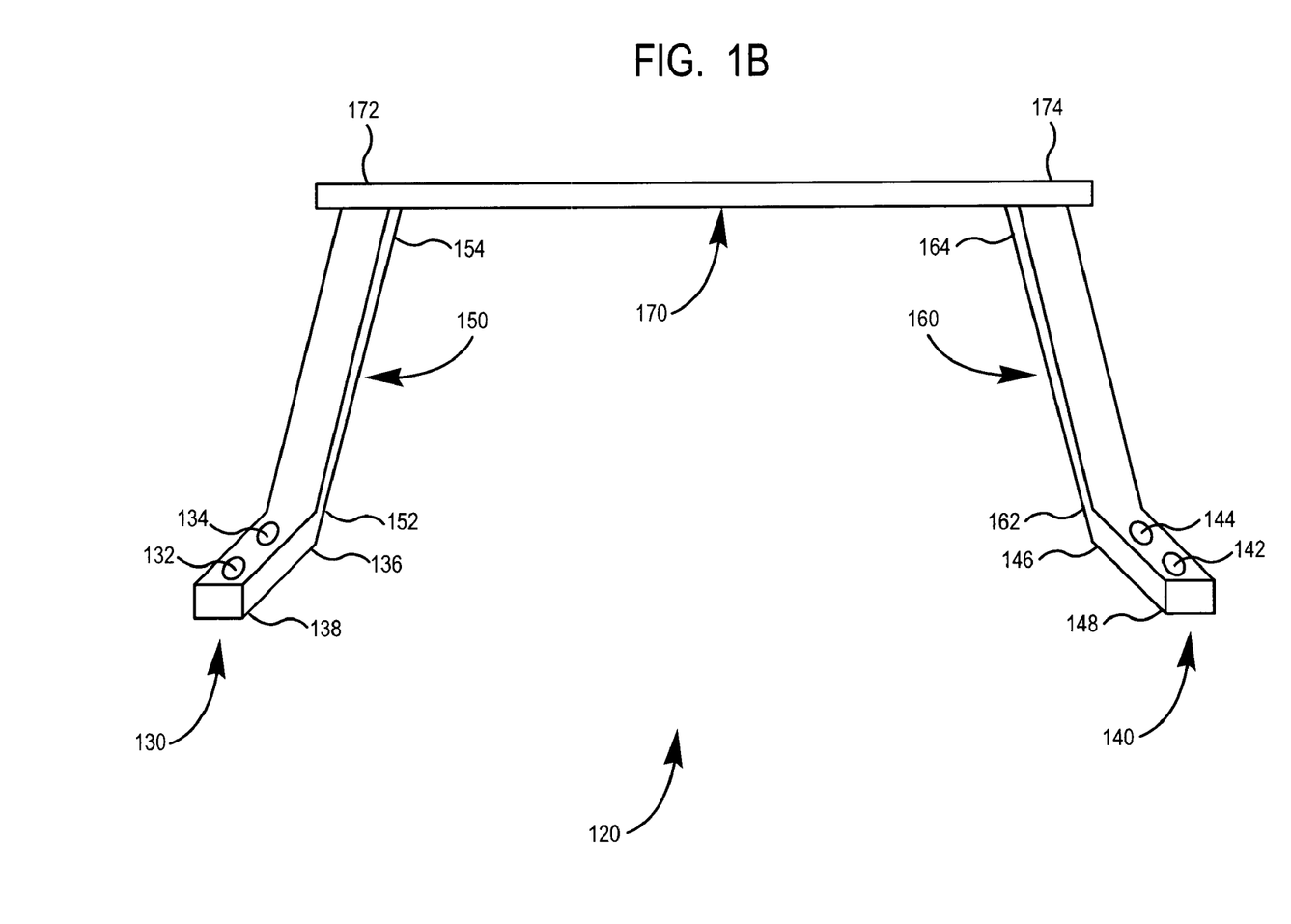
FIG. 1B is a side view of one embodiment of Applicant's rack assembly.

FIG. 1B is a perspective view of one embodiment of Applicant's attachment rack. Applicant's attachment rack assembly 120 comprises a first fixturing member 130, second fixturing member 140, first vertical member 150, second vertical member 160, and connecting member 170.

In the illustrated embodiment of FIG. 1B, first fixturing member 130 comprises first end 136 and second end 138, and is formed to include first fixturing member apertures 132 and 134 extending therethrough. In other embodiments, Applicant's first fixturing member 130 comprises one aperture extending therethrough. In yet other embodiments, Applicant's first fixturing member 130 comprises more than 2 apertures extending therethrough.

In the illustrated embodiment of FIG. 1B, second fixturing member 140 comprises first end 146 and second end 148, and is formed to include first fixturing member apertures 142 and 144 extending therethrough. In other embodiments, Applicant's second fixturing member 140 comprises one aperture extending therethrough. In yet other embodiments, Applicant's second fixturing member 130 comprises more than 2 apertures extending therethrough.

First vertical member 150 comprises first end 152 and second end 154. In the illustrated embodiment of FIG. 1B, first end 152 of vertical member 150 is attached to first end 136 of first fixturing member 130, and second end 154 extends outwardly from vertical member 150. In the illustrated embodiment of FIG. 1B, first end 162 of vertical member 160 is attached to first end 146 of second fixturing member 140, and second end 164 extends outwardly from vertical member 160.

Connecting member 170 comprises first end 172 and second end 174. First end 172 is attached to end 154 of vertical member 150. Second end 174 is attached to end 164 of vertical member 160. In certain embodiments, first fixturing member 130, vertical member 150, connecting member 170, vertical member 160, and second fixturing member 140 comprise an integral assembly.

Figure 1C:
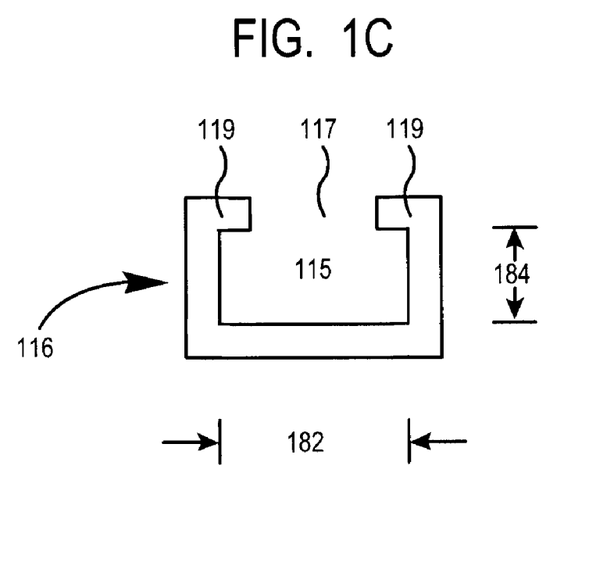
FIG. 1C is a cross sectional view of Applicant's rectangular tubular member.

FIG. 1C shows a cross-sectional view of rectangular tubular member 116, wherein rectangular tubular member 116 defines inter lumen 115. Side 119 is formed to include longitudinal lumen 117 extending therethrough. Lumen 115 comprises length 182 and height 184.

Figure 1D:
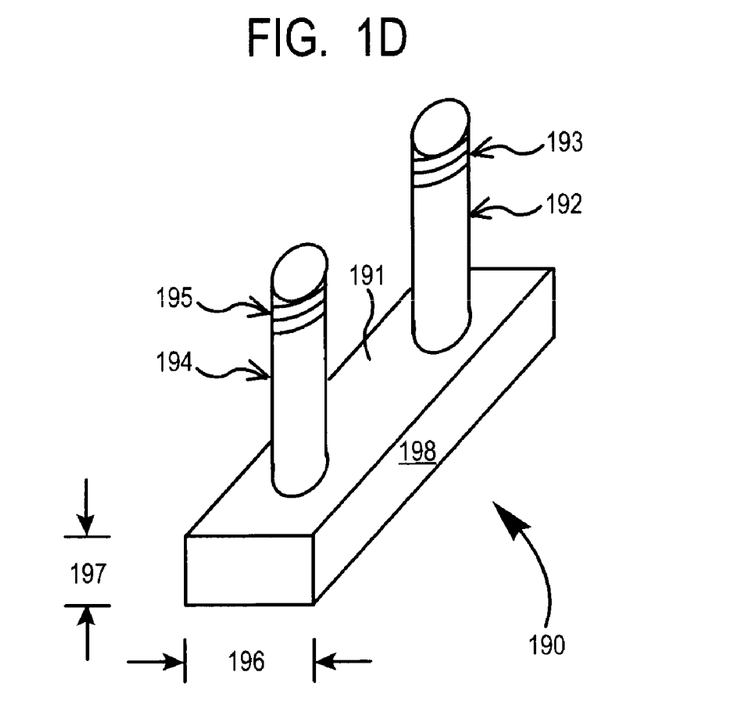
FIG. 1D is a perspective view of Applicant's securing member which is slideably disposed within Applicant's rectangular tubular member.

Referring now to FIGS. 1C and 1D, FIG. 1D is a perspective view of Applicant's securing member 190. In the illustrated embodiment of FIG. 1D, securing member 190 comprises rectangular base 198, surface 191, first cylindrical member 194, second cylindrical member 192, length 196, and height 197. First cylindrical member 194 is attached to surface 191 of rectangular base 198 and extending upwardly. The distal end 195 of first cylindrical member 194 is threaded. Second cylindrical member 192 is attached to surface 191 of rectangular base 198 and extending upwardly. The distal end 193 of first cylindrical member 192 is threaded. Length 196 is less than length 182. Height 197 is less than height 184. Securing member 190 can be moveably disposed within lumen 115 such that cylindrical members 192 and 194 extend outwardly through longitudinal aperture 117.

Figure 1E:
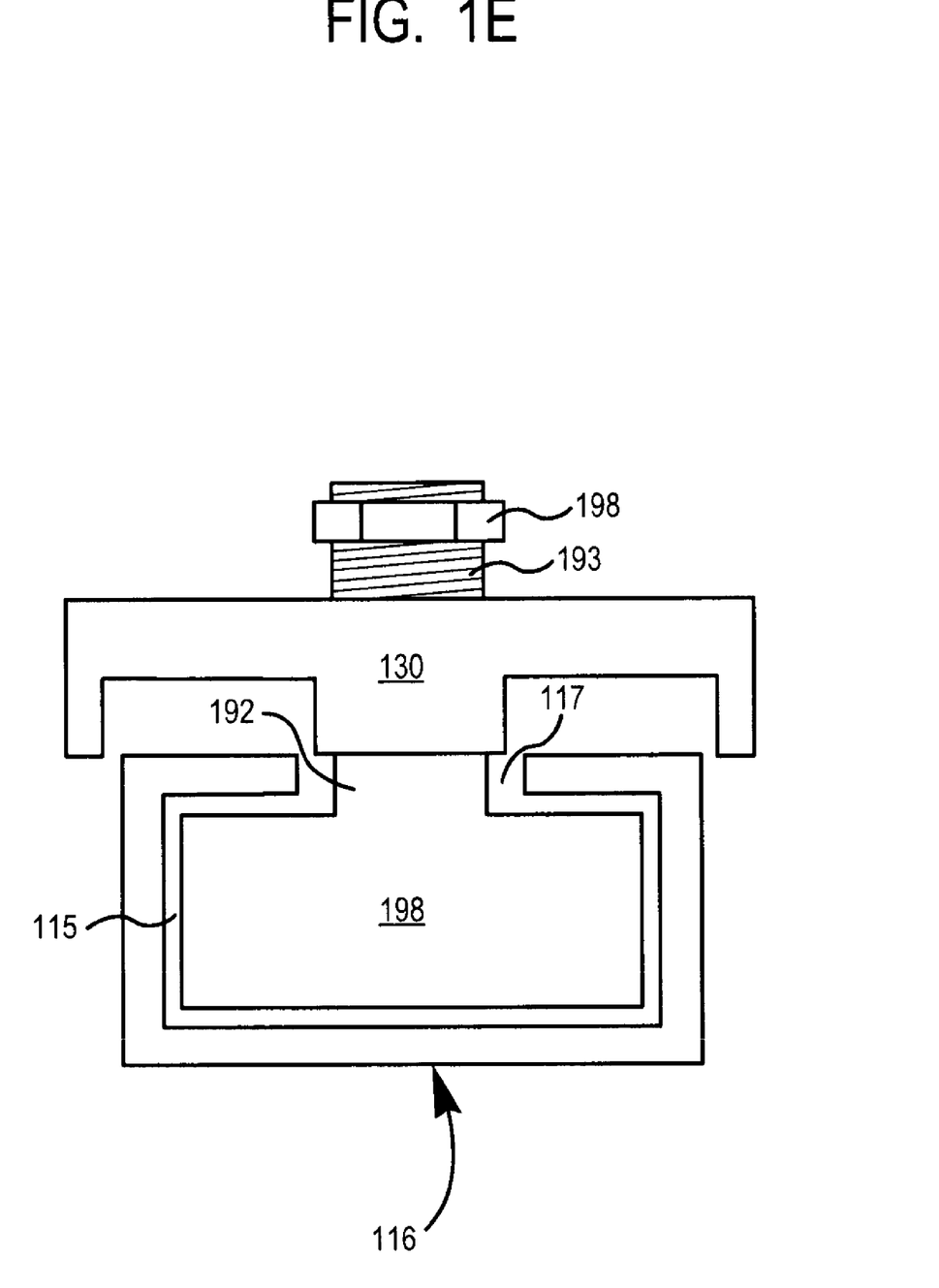
FIG. 1E is a cross sectional view showing Applicant's securing member of FIG. 1D releaseably attaching the fixturing member portion of Applicant's rack assembly of FIG. 1B to Applicant's rectangular tubular member.

FIG. 1E illustrates securing member 190 disposed within lumen 115, such that cylindrical member 192 extends outwardly through longitudinal aperture 117 and through first fixturing member aperture 132 (FIG. 1B). Securing nut 198 can threadedly coupled to distal end 193 of threaded cylindrical member 192. Tightening securing nut 198 pulls securing member 190 upwardly and into contact with tubular member 116 thereby releaseably securing fixturing member 130 to tubular member 116.

Figure 3A:
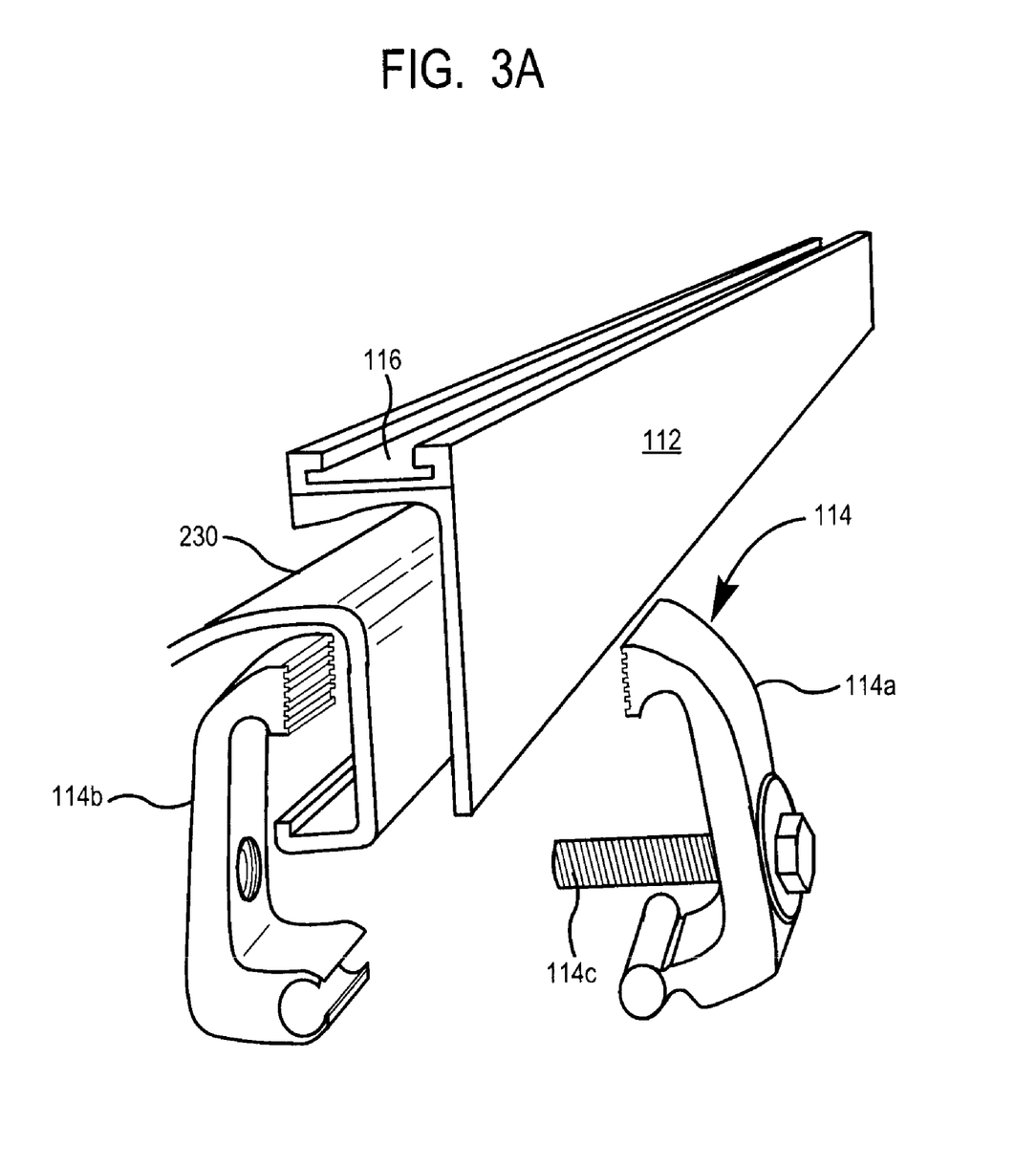
FIG. 3A is a perspective view showing an embodiment wherein Applicant's L-shaped assembly and Applicant's rectangular tubular member comprise an integral assembly.

In the illustrated embodiments of FIGS. 2 and 3A, rectangular tubular member 116 and L-shaped assembly 112 comprise an integral unit. FIG. 2 further shows use of first compliant material 118a and second compliant material 118b. The load applied to the accessory rail 110 is distributed between the clamped vertical portion 111 and the horizontal portion 113 which is supported by the truck bed side rail 230.

In certain embodiments, truck accessory rail 110 is releaseably attached to the truck side 230a (FIGS. 1A, 2) and/or truck side 230b (FIG. 1A), using one or more clamps 114 FIGS. 1A, 2, 3A, 3B). Clamp 114 comprises first clamp portion 114a, second clamp portion 114b, and clamp fixturing means 114c. In certain embodiments, first clamp portion 114a comprises a rigid material selected from the group consisting of metal, an engineering plastic, wood, or combinations thereof. In certain embodiments, second clamp portion 114b comprises a rigid material selected from the group consisting of metal, an engineering plastic, wood, or combinations thereof.

In certain embodiments, accessory rail 110 is shaped in such a way that the vertical portion 111 and/or the horizontal portion 113 mirror the contours of truck side 230, thereby maximizing the contact area between rail 110 and truck side 230. In other embodiments, first compliant material 118a and/or second compliant material 118b are shaped to mirror the contours of truck side 230, thereby maximizing the contact area between rail 110 and struck side 230. As those skilled in the art will appreciate maximizing the contact area between rail 110 and struck side 230 most effectively distributes the load carrier by Applicant's accessory rail 110.

In the illustrated embodiment of FIG. 2, first compliant material 118a is disposed between vertical portion 111 and vehicle side portion 230, and second compliant material 118b is disposed between horizontal portion 113 and vehicle side portion 230. In certain embodiments, first compliant material and second complaint comprise an integral assembly.

In certain embodiments, first compliant material 118a comprises a material selected from the group consisting of an elastomer, a rigid thermoplastic/thermoset material, a flexible foam, a rigid foam, or combinations thereof. In certain embodiments, second compliant material 118b comprises a material selected from the group consisting of an elastomer, a rigid thermoplastic/thermoset material, a flexible foam, a rigid foam, or combinations thereof.

In certain embodiments, first compliant material 118a and/or second compliant material 118b may be shaped to improve the fit of the accessory rail 110 against the truck side 230. In other embodiments, unshaped portions of the compliant material may be installed in an asymmetrical way to provide a contoured fit.

Compliant materials 118a and 118b serve three purposes, namely to protect the truck side portion 230, to improve the fit of the accessory rail 110, and to permit universal application of Applicant's accessory rail. By "improve the fit," Applicant means to maximize the contact area between Applicant's rail accessor 110 and the side of a truck bed. Compliant materials 118a and/or 118b can be dimensioned, shaped, and/or contoured, to permit Applicant's accessory rail 112 to be releaseably attached to a wide variety of trucks.

Figure 3B:
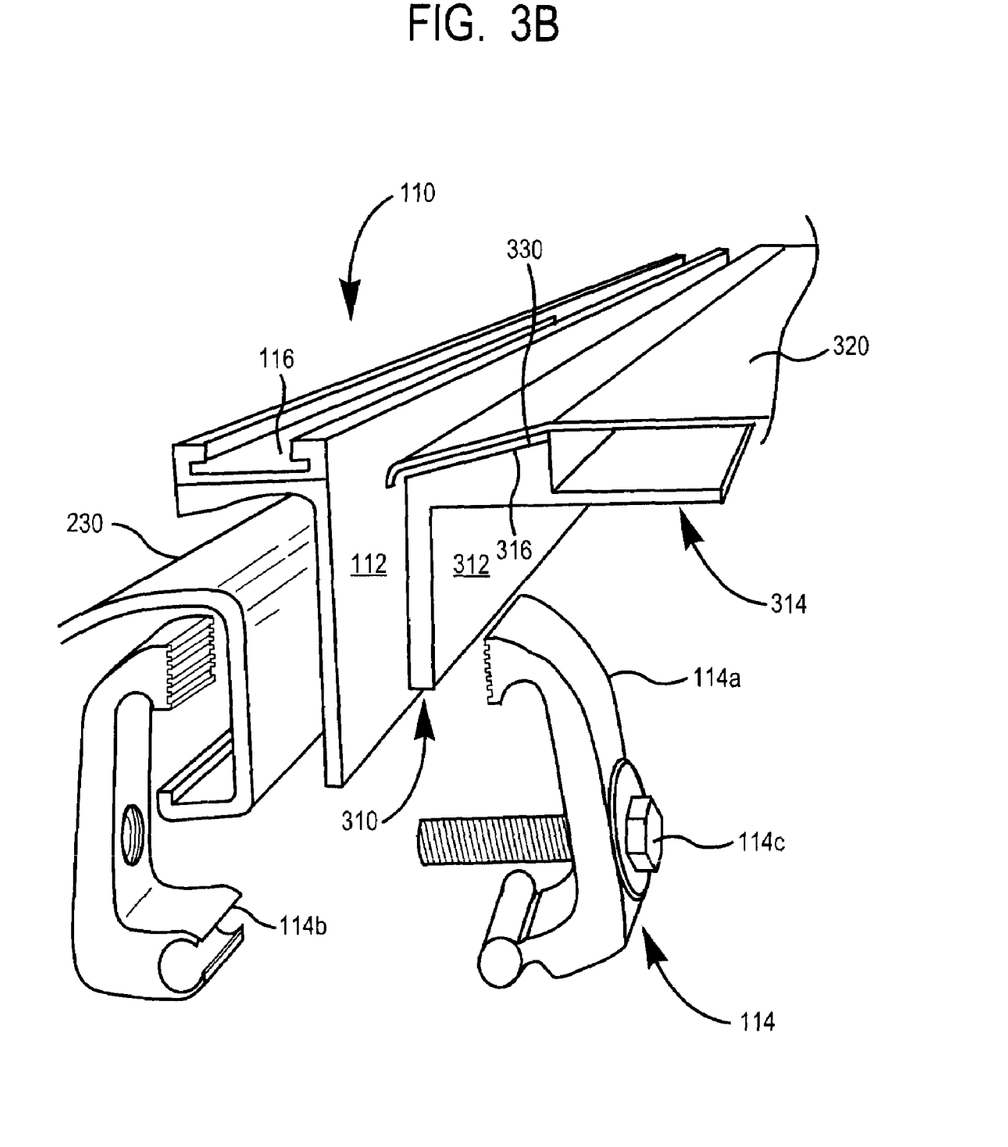
FIG. 3B shows one side of a second embodiment of Applicant's pickup truck accessory which comprises an integral Applicant's L-shaped assembly and rectangular tubular member in combination with a tonneau cover.
Figure 4:
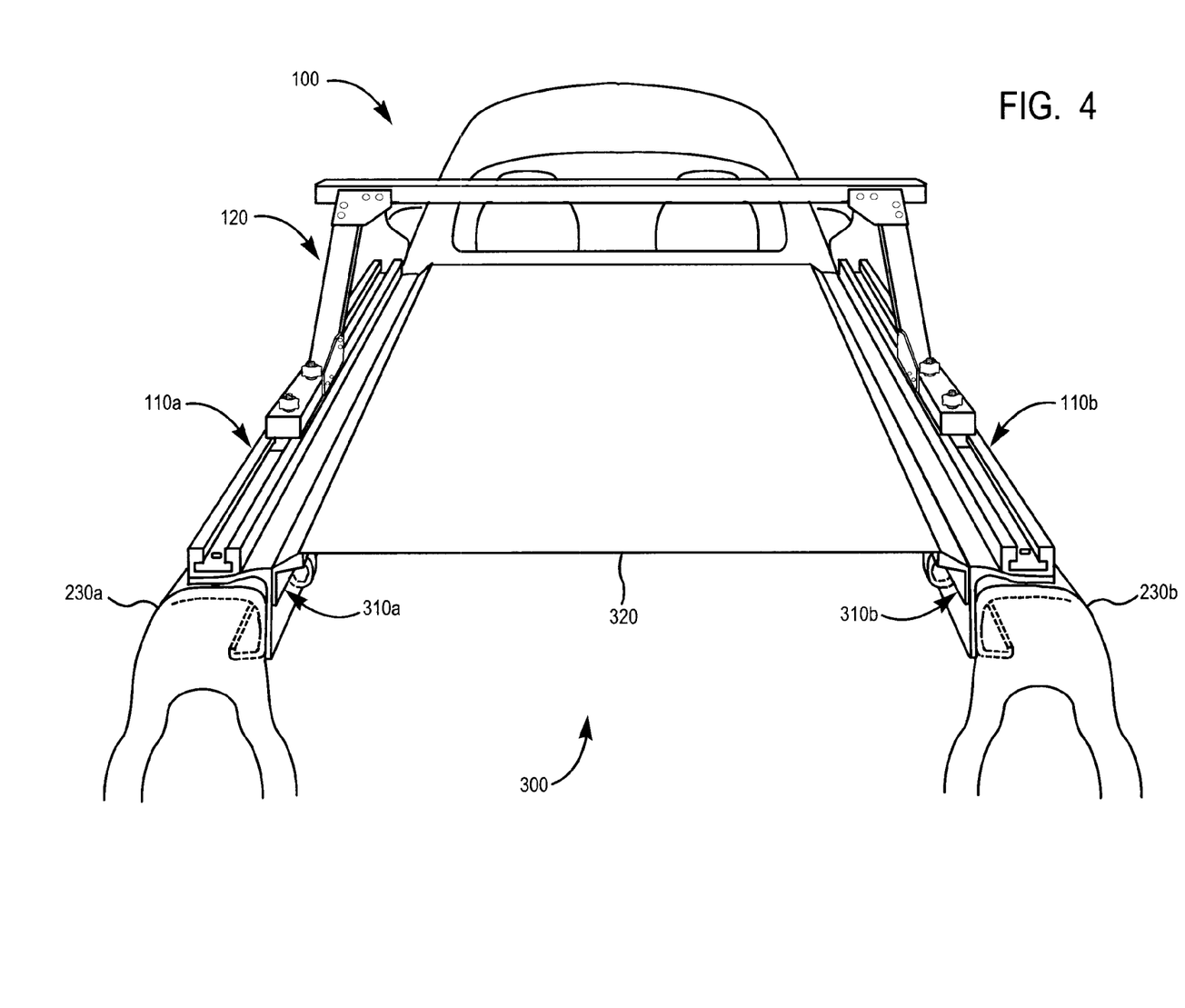
FIG. 4 shows an embodiment of Applicant's pickup truck accessory that comprises a moveable overhead rack and a tonneau cover.

Referring now to FIGS. 2, 3B, and 4, tonneau assembly 300 comprises L-shaped members 310a and 310b in combination with cover 320. Cover 320 is attached to surface 316 of L-shaped assembly 310 using adhesive 330.

As those skilled in the art will appreciate, tonneau assembly 300 comprises an after-market truck accessory sold by a variety of manufacturers. Applicant's accessory rail 110 allows the simultaneous attachment of both an aftermarket truck accessory mount, such as overhead rack 120 (FIG. 1) and a truck bed cover, such as tonneau assembly 300. In the illustrated embodiments of FIGS. 3B and 4, accessory rail 110 is releaseably disposed between L-shaped assembly 310 and the truck side 230 such that horizontal portion 113 (FIG. 2) of accessory rail 110 rests on the top of truck side 230. Vertical portion 111 (FIG. 2) of accessory rail 110 is dimensioned such that it does not interfere with the installation of tonneau assembly 300.

Figure 5A:
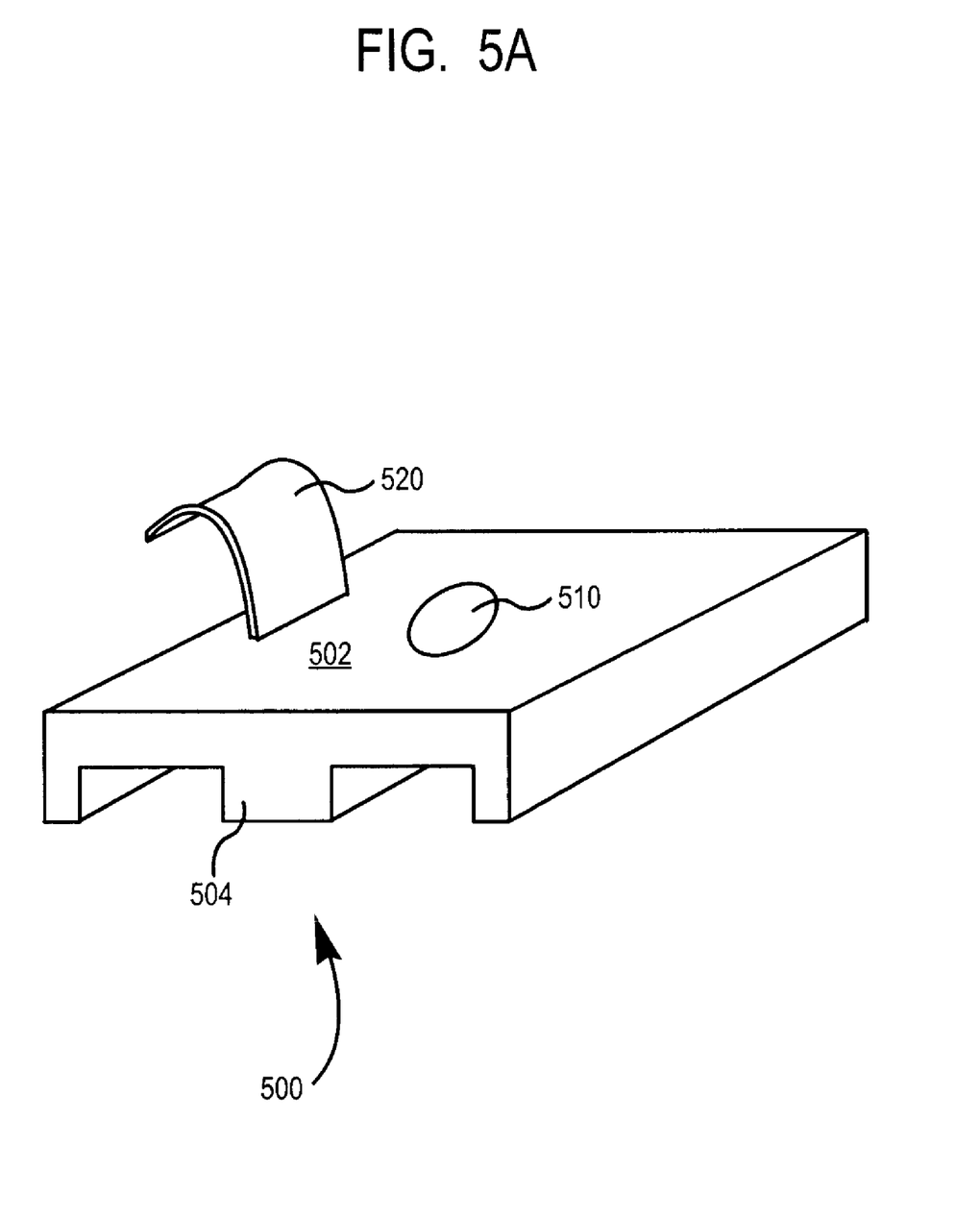
FIG. 5A shows a tie-down assembly used to attach objects to Applicant's pickup truck accessory.
Figure 5B:
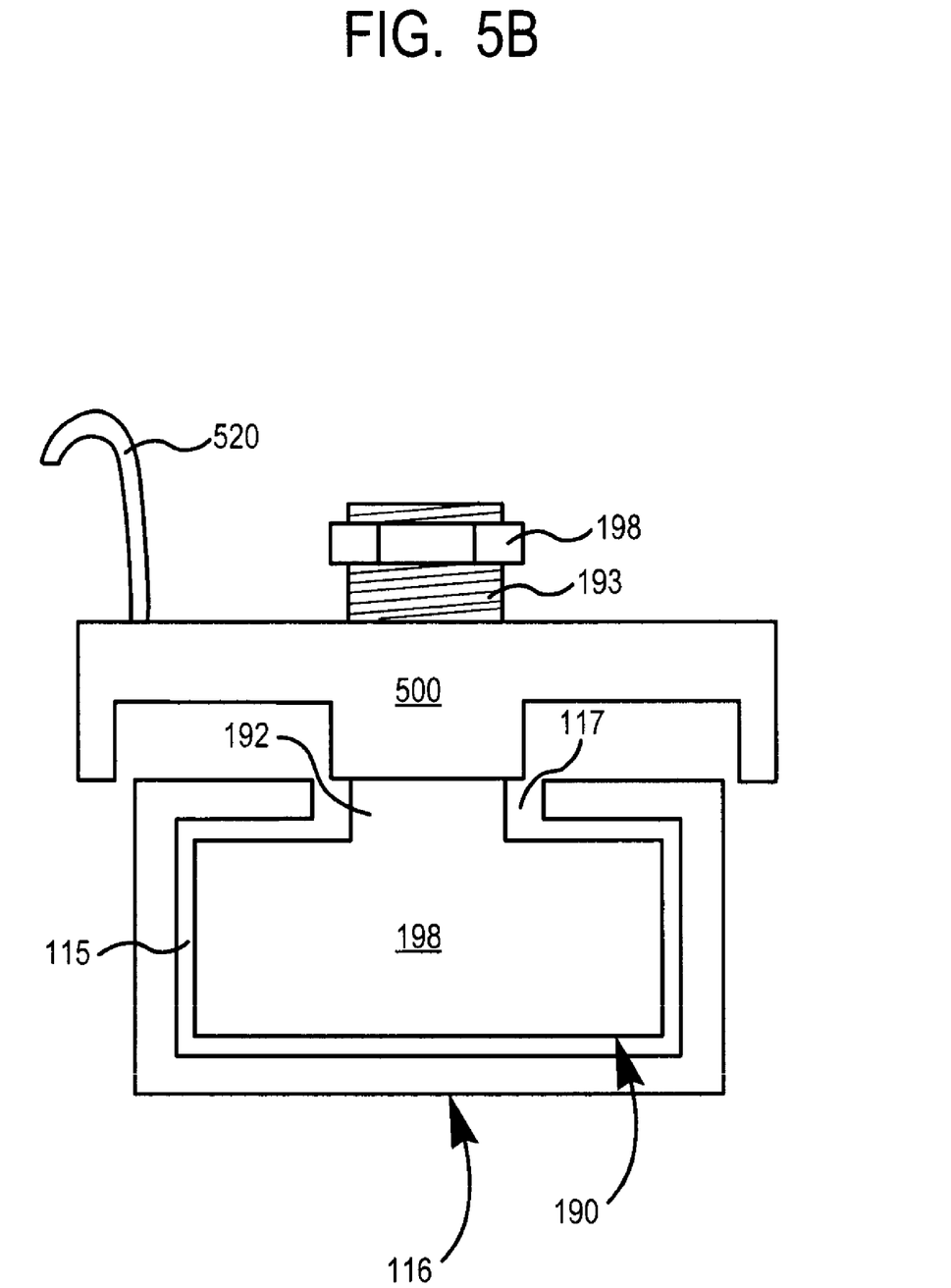
FIG. 5B shows the tie-down assembly of FIG. 5A secured to Applicant's tubular member using the securing member of FIG. 1D.

Referring to FIGS. 5A and 5B, fastener 500 is dimensioned to mate with rectangular member 116 such that tab 504 can be removeably inserted into longitudinal aperture 117. Fastener 500 comprises hook-shaped attachment member 520 attached to and extending upwardly from surface 502. FIG. 5B shows securing member 190 being used to releaseably attach fastener 500 to rectangular tubular member 116. A plurality of fasteners 500 can be secured to accessory rails 110a (FIG. 1A) and 110b (FIG. 1A). One or more ropes and/or elastic straps can be affixed to that plurality of fasteners 500 to hold an irregular shaped object within truck bed 102 (FIG. 1A).

Figure 6:
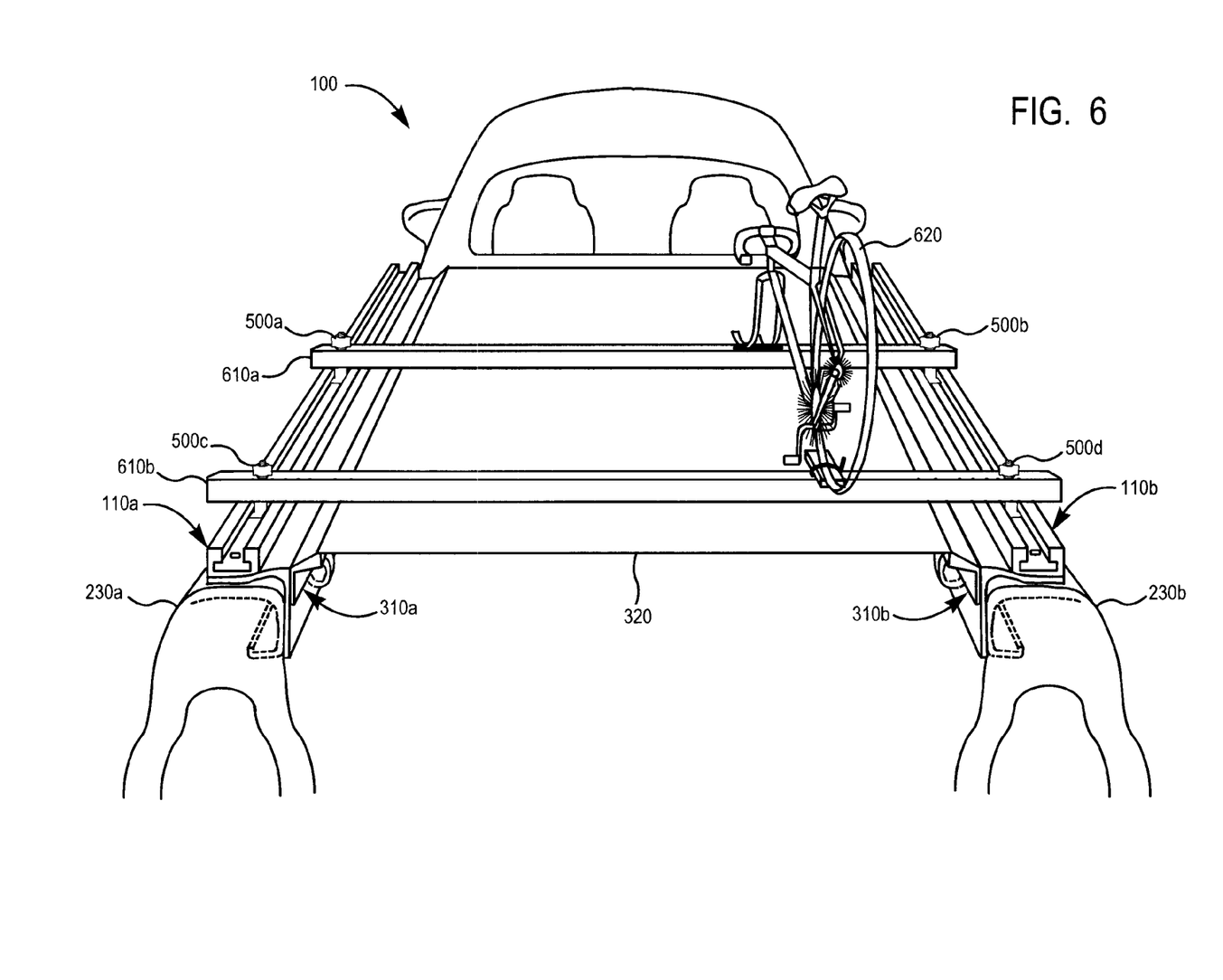
FIG. 6 shows an embodiment of Applicant's pickup truck accessory comprising two rack assemblies in combination with a tonneau cover.

Referring to FIG. 6, first accessory rail 110a and first tonneau assembly L-shaped assembly 310a are releaseably attached to truck side portion 230a, and second accessory rail 110b and second tonneau assembly L-shaped assembly 310b are releaseably attached to truck side portion 230b. First horizontal member 610a is releaseably attached to accessory rails 110a and 110b using fasteners 500a and 500b, respectively. Second horizontal member 610b is releaseably attached to accessory rails 110a and 110b using fasteners 500c and 500d, respectively. Bicycle 620 is releaseably attached to first horizontal member 610a and to second horizontal member 610b.

While the preferred embodiments of the present invention have been illustrated in detail, it should be apparent that modifications and adaptations to those embodiments may occur to one skilled in the art without departing from the scope of the present invention as set forth in the following claims.

I claim:

1. A pickup truck accessory, comprising:
   a first L-shaped assembly comprising a first planar member attached to and extending outwardly from a second planar member, wherein said first L-shaped member can be removeably attached to a first side of a pickup truck bed such that said first planar member is disposed horizontally along a top of said first side;
   a first rectangular tubular member comprising a first end and a second end and formed to include a first longitudinal aperture extending through a side from said first end to said second end, wherein said first rectangular tubular member is attached to said first planar member such that said longitudinal aperture faces outwardly from said first planar member;
   a second L-shaped assembly comprising a third planar member attached to and extending outwardly from a fourth planar member, wherein said first L-shaped member can be removeably attached to a second side of said pickup truck bed such that said third planar member is disposed horizontally along a top of said second side;
   a second rectangular tubular member comprising a third end and a fourth end and formed to include a second longitudinal aperture extending through a side from said third end to said fourth end, wherein said second rectangular tubular member is attached to said third planar member such that said second longitudinal aperture faces outwardly from said third planar member;
   a rack assembly comprising a first fixturing member formed to include a first fixturing member aperture extending therethrough, a second fixturing member formed to include a second fixturing member aperture extending therethrough, and a connecting member having two ends, wherein a first end of said connecting member is attached to said first fixturing member, and wherein a second end of said connecting member is attached to said second fixturing member;
   a first securing member comprising a first rectangular base and a first cylindrical member attached to said first rectangular base and extending outwardly therefrom, wherein the distal end of said first cylindrical member is threaded, wherein said first rectangular base is moveably disposed within said first tubular member, and wherein said distal end of first cylindrical member extends through said first longitudinal aperture, and wherein said distal end of said first cylindrical member extends through said first fixturing member aperture;
   a second securing member comprising a second rectangular base and a second cylindrical member attached to said second rectangular base and extending outwardly therefrom, wherein the distal end of said second cylindrical member is threaded, wherein said second rectangular base is moveably disposed within said second tubular member, and wherein said distal end of second cylindrical member extends through said second longitudinal aperture, and wherein said distal end of said second cylindrical member extends through said second fixturing member aperture;

a tonneau assembly comprising a third L-shaped assembly comprising a fifth planar member attached to and extending outwardly from a sixth planar member, a fourth L-shaped assembly comprising a seventh planar member attached to and extending outwardly from an eighth planar member, and a tonneau cover having a first side and an opposing second side, wherein said first side of said tonneau cover is attached to said sixth planar member and wherein said second side of said tonneau cover is attached to said eighth planar member;

a first plurality of clamps to releaseably attach said first L-shaped assembly to said first side of said pickup truck bed and said third L-shaped assembly to said first L-shaped assembly;

a second plurality of clamps to releaseably attach said second L-shaped assembly to said second side of said pickup truck bed and said fourth L-shaped assembly to said second L-shaped assembly.

2. The pickup truck accessory of claim 1, wherein:
said first L-shaped assembly and said first rectangular tubular member comprise an integral assembly; and
said second L-shaped assembly and second first rectangular tubular member comprise an integral assembly.

3. The pickup truck assembly of claim 1, further comprising:
a first compliant material disposed between said first L-shaped assembly and said first side of said pickup truck;
a second compliant material disposed between said second L-shaped assembly and said second side of said pickup truck.

4. The pickup truck assembly of claim 3, wherein:
said first compliant material is selected from the group consisting of an elastomer, a thermoplastic, and a flexible foam; and
said second compliant material is selected from the group consisting of an elastomer, a thermoplastic, and a flexible foam.

5. The pickup truck accessory of claim 4, wherein:
said first L-shaped assembly, and said first rectangular tubular member, and said first compliant material, comprise an integral assembly; and
said second L-shaped assembly, and second first rectangular tubular member, and said second compliant material, comprise an integral assembly.

6. The pickup truck accessory of claim 5, wherein:
said first L-shaped assembly, and said first rectangular tubular member, and said first compliant material, and said first plurality of clamps, comprise an integral assembly; and
said second L-shaped assembly, and second first rectangular tubular member, and said second compliant material, and said second plurality of clamps, comprise an integral assembly.

7. The pickup truck accessory of claim 1, wherein said rack assembly further comprises:
a first vertical member, wherein said first vertical member is disposed between said first fixturing member and said connecting member; and
a second vertical member, wherein said second vertical member is disposed between said second fixturing member and said connecting member.

* * * * *